United States Patent [19]

Futrell, II

[11] Patent Number: 4,840,062
[45] Date of Patent: Jun. 20, 1989

[54] FIBER OPTIC CURRENT METER WITH PLASTIC BUCKET WHEEL

[75] Inventor: James C. Futrell, II, Picayune, Miss.

[73] Assignee: The United States of America as represented by the Secretary of Interior, Washington, D.C.

[21] Appl. No.: 94,975

[22] Filed: Sep. 10, 1987

[51] Int. Cl.⁴ .............................................. G01D 21/00
[52] U.S. Cl. ................................. 73/170 A; 73/861.85
[58] Field of Search ................ 73/170 A, 861.79, 189, 73/861.83, 861.85, DIG. 11; 324/175; 250/227

[56] References Cited

U.S. PATENT DOCUMENTS

| | | | |
|---|---|---|---|
| 1,413,355 | 4/1922 | Price | 73/861.79 X |
| 3,541,855 | 11/1970 | Frenzen et al. | 73/189 X |
| 3,699,801 | 10/1972 | Jones | 73/189 |
| 4,088,387 | 5/1978 | Lewis | 250/227 X |

Primary Examiner—Jerry W. Myracle
Attorney, Agent, or Firm—E. Philip Koltos

[57] ABSTRACT

A current meter for measuring velocity in a moving fluid is disclosed which comprises a one-piece plastic bucket wheel retained by a yoke or other suspension device and a signal generating device comprised of fiber optic cables which make and break an infrared light path in order to generate a signal. The fiber optic cables are connected to a vertical shaft which rotates when the pressure of a moving fluid is applied to the bucket wheel, and the signal generated thereby is proportional to the velocity of the fluid. The current meter of the present invention is adapted to be used with a variety of support equipment, such as a wading rod, an ice rod, or a sounding cable with a hanger strap, and thus can be used to measure flow velocity in deep, shallow, slow, or swift streams, as well as in ice-covered rivers.

7 Claims, 1 Drawing Sheet

U.S. Patent    Jun. 20, 1989    4,840,062
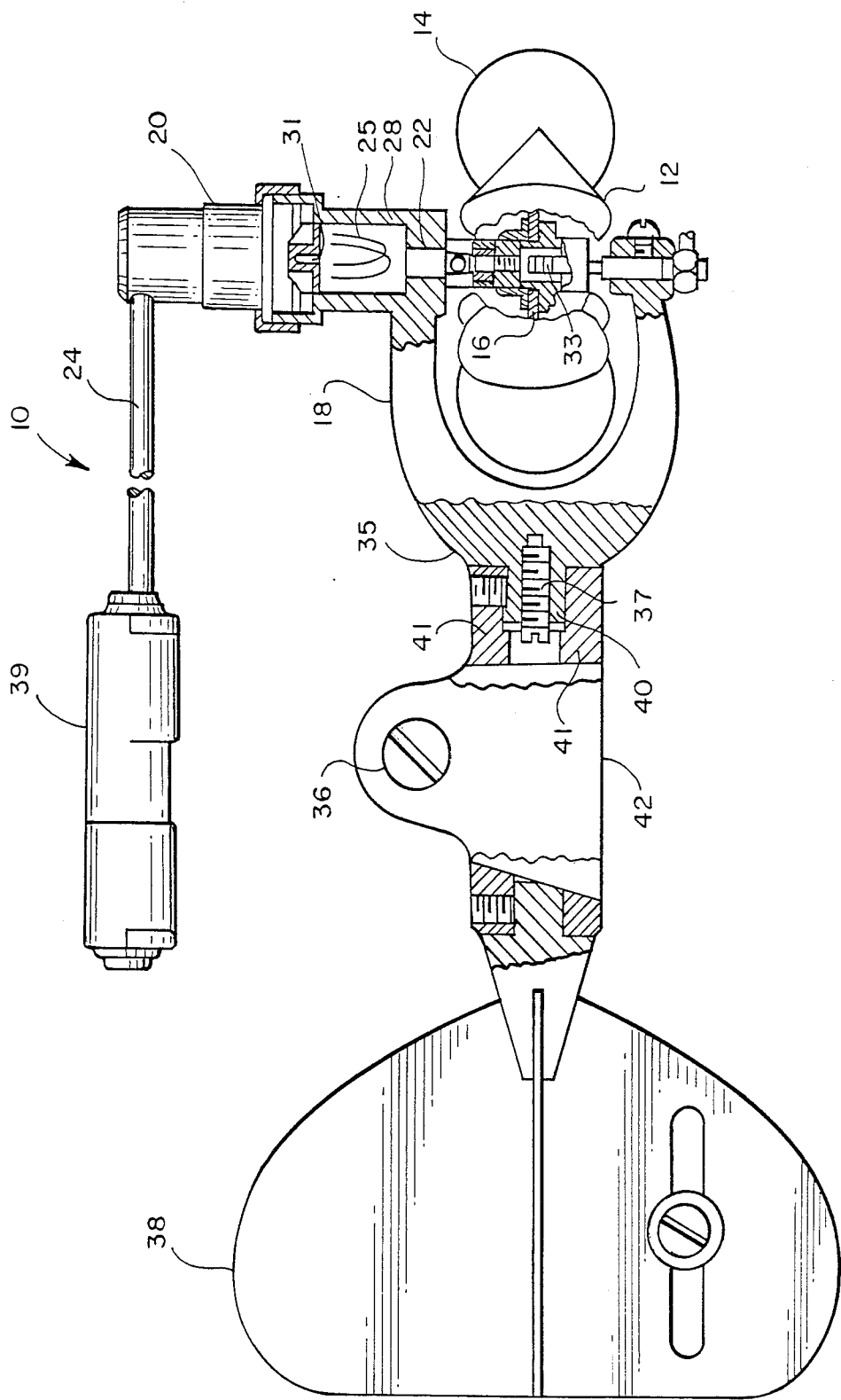

FIBER OPTIC CURRENT METER WITH PLASTIC BUCKET WHEEL

FIELD OF THE INVENTION

The invention relates generally to a device for measuring fluid velocity, and more specifically to a current meter for measuring flow velocity in streams and rivers comprising a plastic bucket wheel and an optic head counting system.

BACKGROUND OF THE INVENTION

In the scientific study of streams and rivers, it is highly desirable to take accurate readings of the various hydrological parameters of the stream, particularly with regard to flow discharge. These readings must be taken whether the stream is a small, wadable one, or one which is a major river. In addition, measurements must be made for rivers which are completely flowing, as well as those which are covered by a top layer of ice. Although there are many devices for measuring flow in a moving stream, most of them cannot be used for the variety of flow measurements required in different types of streams and rivers.

The prior art includes many devices for measuring underwater flow velocity. Among these are the Price type AA current meter which is used for depths 1.5 feet and deeper. This meter is seldom used through ice cover due to its size. Additionally there is the Price pygmy current meter which is used for depths less than 1.5 feet and which can be used through ice cover due to its small size, and the four-vane vertical axis meter, used on a rod, which also takes flow measurements of streams under ice cover (all disclosed in Buchanan et al., *Discharge Measurements at Gaging Stations*, U.S. Geological Survey, 1969, pp. 4-7). These devices are generally suitable for specific functions and for specific velocities and depth, but do not work well in other types of stream conditions. What is desired is a current meter which can be employed with a variety of support equipment and which can be used to measure fluid velocity conveniently and accurately in shallow streams, deep rivers, and ice-covered waterways as well.

SUMMARY OF THE INVENTION

According to the present invention, a versatile current meter for use in the measurement of velocity of a moving fluid is provided which comprises a one-piece plastic bucket wheel assembly, consisting of a plurality of cups attached to a ring which is mountable on a shaft, and a signal generating means comprising U-shaped fiber optic cables connected to a shaft. When the bucket wheel assembly rotates in response to a moving fluid, the fiber optic cables rotate due to their attachment to the vertical axis shaft which allows the passage or blockage of a light path through the fiber-optic network. The moving fluid thereby generates a signal which goes from the fiber optic network to a signal receiving means which translates the signal into a reading of velocity. The current meter of the present invention is versatile in that it can be used with a variety of support equipment devices, including a wading rod, an ice rod, or a sounding cable, and can thus serve a variety of purposes in stream gauging measurements.

Fluid velocity devices employing a light source blocked by a rotatable member are known in the art. For instance, U.S. Pat. No. 3,771,362 (Roberts) discloses a fluid velocity indicator for torpedoes and submarines which includes opaque projections connected to a propeller shaft which move between a light source and a light sensor in order to indicate velocity. In U.S. Pat. No. 3,680,378 (Aurillo et al.), a device is disclosed for measuring the flow rate of air in a passage in which a vaned turbine member with a transverse aperture rotates between a light source and a photocell to measure flow. In U.S. Pat. No. 4,433,583 (Kirk), a flow meter is disclosed in which a rotor has a plurality of teeth upon which a light beam is reflected in order to measure flow. Finally, U.S. Pat. No. 4,467,660 (McMillan, Jr.) discloses a measuring transducer for detecting low gas flow rates having a photoelectric circuit which directs light onto portions of a toothed disk.

In addition to the above devices, U.S. Pat. No. 582,874 (Price) discloses a six cup, metal bucket wheel, acoustic current meter to measure a flowing stream. This mechanical counting system used a hammer to strike a diaphragm for every tenth bucket wheel revolution. The sound was transmitted through tubing which was routed above the meter surface and which worked in a similar manner as a stethoscope. Neither this reference nor the references discussed above disclose a flow-responsive plastic bucket wheel assembly which works in conjunction with a fiber optic-head counting system in order to measure velocity of stream flow under a wide range of conditions, as is provided in the current meter of the present invention.

BRIEF DESCRIPTION OF DRAWING FIGURE

The drawing FIGURE is a side schematic view of the current meter of the present invention.

DETAILED DESCRIPTION OF THE PREFERRED EMBODIMENTS

In accordance with the present invention, a current meter 10 for use with various supporting means (not shown) is provided, as observed in the drawing FIGURE. The current meter comprises a one-piece plastic bucket wheel assembly 12, comprising a plurality of cups 14 connected to a ring 16, which is suspended by means of a yoke 18 or other suitable suspension means which allows bucket wheel assembly 12 to rotate in response to a moving fluid, and a fiber-optic signal generating means 20 including a shaft 22 upon which the bucket wheel assembly is mounted. The signal generating means 20 is comprised of fiber optic cables 25 which are connected to shaft 22 in such a way as to create a light path which is passed or blocked when the shaft rotates, as will occur when the bucket wheel assembly 12 rotates in response to the movement of a fluid. The breaking of the light path generates a low friction signal which is proportional to fluid velocity, and the signal is transmitted through wires 24 to a signal receiving means (not shown) which can translate the signal into a reading of velocity.

The plastic bucket wheel assembly 12 is the subject of my co-pending U.S. patent application, and is further described therein. This application bears Ser. No. 094,976 and was filed on Sept. 10, 1987. The bucket wheel assembly is a lightweight molded one-piece plastic disk which is essentially comprised of a plurality of conical cups 14 connected to a central ring 16 which is mountable upon a vertical shaft. The cups 14 are roughly co-planar, and are disposed in a symmetrical fashion around ring 16. In the preferred embodiment, the bucket wheel is comprised of six cups. The material used for this assembly can be any lightweight durable plastic known in the art, but it is particularly preferred that a polyethylene or polycarbonate plastic be used for the bucket wheel. It is also desirable that the wheel be molded in one monolithic piece using a screw-injection molding machine. This molding process makes standard ratings for the meter practical and economical.

The bucket wheel assembly 12 is designed to rotate in response to the movement of a fluid, and generate a signal proportional to flow velocity. It has further been observed that this bucket wheel assembly is non-responsive to the vertical component of river flow when rigidly held by suitable supporting means, and the signal generated in the current meter of the present invention is thus proportional only to the horizontal component of fluid velocity and not the vertical component. This characteristic of the bucket wheel results in a measurement of flow velocity which is more accurate than those obtained using prior art devices which do not eliminate the undesirable vertical component of flow velocity and yield an over registration or reading error. The current meter of the present invention, being responsive only to the desired horizontal component of flow velocity, can give a truer and more accurate picture of stream flow. In addition, the present invention can operate in much lower stream velocities because of the elimination of mechanical drag within the light-path counting system.

The signal generating means 20 of the current meter of the present invention is comprised of a fiber optic cable network, preferably comprising two equally spaced fiber optic cables 25 which are potted adjacent each other and attached shaft 22, upon which bucket wheel assembly 12 is mounted. The fiber optic cables are U-shaped, and are potted within cylindrical receptacle 28 extending from shaft 22. The cables are arranged so that a path of infrared light is passed, or blocked when the shaft 22 is rotated by the bucket wheel assembly 12. It is preferred that the cables be constructed in such a way as to generate a four-count signal for each revolution of the bucket wheel. However, more or less signals are practical with this method.

The signal generating means of the present invention involves breaking a light path and is thus practically frictionless, which allows much more accurate response to low flow velocities than before possible. The present current meter is able to facilitate early detection of low velocities of flow due to the virtual elimination of mechanical drag within the counting system (light path).

The signal generated as described above is transmitted out from wire 24 through a snap-together underwater connector 39 to a suitable signal receiving means (not shown) which can translate the signal into a reading of velocity. It is preferred that a Current Meter Digitizer (or CMD) be used as the signal receiving means in the present invention. The CMD is a device developed by the U.S. Geological Survey, NSTL, MS and is available only from the USGS. The CMD can provide the power for the signal generating means, and will record the counts from the rotation of the bucket wheel in a digital fashion. The signal produced from the generating means is a clean square wave with a 60/40% duty cycle. When the signal is received by the CMD, it is first translated into a reading of revolutions per unit time, followed by a direct reading of flow velocity. The CMD may also be used as a real-time velocity read-out device in a separate mode. In other words, the velocity at the meter is displayed in Feet Per Second as the meter turns. As indicated above, when used with the current meter of the present invention, the CMD will provide a reading of velocity which will be non-responsive to the vertical component of flow when the meter is rigidly held on a rod, cable or other suitable supporting device.

The current meter of the present invention is versatile in that it can be used with various types of supporting rods and cables, and can take a variety of flow readings from streams with a wide range of depths and velocities. The current meter should be connected to these various support members in such a way that the bucket wheel assembly can be suspended within a moving fluid and rotate in an unobstructed manner in order to generate the signal proportional to flow velocity. In operation, one uses a suitable support member attached to the yoke or other suspension means in order to position the bucket wheel of the current meter at a desired point in a flowing stream in order to get a reading of flow velocity.

As observed in the drawing figure, the current meter 10 of the present invention is preferably connected to the desired support member by means of a yoke 18 which is attached to the shaft 22 of the signal generating means 20. The yoke 18 freely suspends shaft 22 with the aid of elements 31 and 33, which comprise upper and lower pivot bearings, respectively. These bearings allow free rotation of the shaft, yet also prevent it from wobbling too far. The closed end 35 has an extending piece 40 and screw means 37 in order to allow the yoke to be connected to a suitable supporting device. When properly positioned, the yoke 18 keeps the bucket wheel assembly 12 suspended in the flowing stream in such a manner as to allow rotation of the bucket wheel, which generates the signal proportional to flow velocity.

Any suitable support member, such as an ice rod, wading rod or cable which can accurately position the current meter and not obstruct the flow can be used with the current meter of the present invention. In the embodiment observed in the drawing figure, the current meter 10 is adapted for use with a sounding cable (not shown). As depicted, the closed end 35 of the yoke attaches through end piece 40 to a cable suspension mount 42. The cable suspension mount 42 includes attachment screw 36 and a tail fin 38, which assists in keeping the meter in proper position, in addition to yoke attachment means 41 which fits over end piece 40. In this embodiment, the current meter will accept a hanger strap (not shown) through a slot behind attachment screw 36. The hanger strip will be attached to the sounding cable which is cabled onto a sounding reel (not shown). This configuration may be used to measure flow in deep swift rivers from a boat, cableway or bridge, whether or not the river is ice-covered. Cable suspension mounting will be necessary for open channels or frozen rivers when the flow is too deep or swift to use an ice rod or a wading rod to make a flow discharge measurement.

The current meter of the present invention can also be used with other support equipment including rods such an ice rod or a wading rod. When used with an ice rod (not shown), the current meter 10 can be attached by means of the screw 37 at the closed end 35 of yoke 18. The screw means 37 attaches the current meter to the foot of the ice rod where it can be properly positioned in ice-covered rivers. The current meter-ice rod configuration is used to make flow discharge measurements in the frozen rivers by cutting holes in the ice cover at desired locations in the river cross-section.

When used with a wading rod (not shown), a wading rod mount (not shown) is attached to the yoke 18 at the end piece 40 of the yoke's closed end 35. This rod mount includes a mounting screw (not shown) by which the current meter is adjustably attached to the wading rod for stream flow measurement. When used with a wading rod, the current meter of the present invention is suited for flow measurements in open channel streams or in frozen rivers of shallow depths.

The current meter of the present invention thus can be used to provide quick and accurate readings of flow velocity over the wide range of river conditions which will normally be encountered by a stream hydrographer. By use of the proper supporting means, whether wading rod, ice rod, or cable suspension equipment, the current meter will accurately function in shallow streams, deep and swift unwadable rivers, and even ice-covered waterways.

What is claimed is:

1. A current meter for measuring velocity of a moving fluid, said current meter comprising:
   a one-piece plastic bucket wheel assembly comprising a plurality of cups connected to and formed integrally with a central ring mounted for rotation on a rotatable shaft, said cups being disposed in spaced relation around the periphery of the ring and said bucket wheel assembly being capable of rotating in response to fluid movement;
   means for suspending said bucket wheel assembly in a moving fluid so that said bucket wheel assembly rotates in response to fluid movement; and
   a signal generating means, including a fiber optic cable means connected to said rotatable shaft upon which said bucket wheel assembly is mounted and disposed so as to create a light path which is broken during the rotational movement of said bucket wheel assembly, for generating a signal proportional to the velocity of the moving fluid.

2. A current meter according to claim 1 wherein the means for suspending said bucket wheel assembly in a moving fluid comprises a support member connected to said bucket wheel assembly by means of a yoke attached to said shaft.

3. A current meter according to claim 2 wherein the support member is a wading rod.

4. A current meter according to claim 2 wherein the support member is an ice rod.

5. A current meter according to claim 2 wherein the support member is a sounding cable with a hanger strap.

6. A current meter according to claim 1 wherein the bucket wheel assembly is comprised of a polyethylene or polycarbonate plastic.

7. A current meter according to claim 1 wherein the bucket wheel assembly is responsive only to the horizontal component of fluid velocity when rigidly held by suitable supporting means.

* * * * *